(12) United States Patent
Takajo

(10) Patent No.: US 9,906,438 B2
(45) Date of Patent: Feb. 27, 2018

(54) COMMUNICATION NODE, CONTROL APPARATUS, COMMUNICATION SYSTEM, PACKET PROCESSING METHOD, COMMUNICATION NODE CONTROLLING METHOD AND PROGRAM

(71) Applicant: NEC Corporation, Tokyo (JP)

(72) Inventor: Mamoru Takajo, Tokyo (JP)

(73) Assignee: NEC Corporation, Tokyo (JP)

( * ) Notice: Subject to any disclaimer, the term of this patent is extended or adjusted under 35 U.S.C. 154(b) by 229 days.

(21) Appl. No.: 14/651,629

(22) PCT Filed: Dec. 18, 2013

(86) PCT No.: PCT/JP2013/083843
§ 371 (c)(1),
(2) Date: Jun. 11, 2015

(87) PCT Pub. No.: WO2014/098108
PCT Pub. Date: Jun. 26, 2014

(65) Prior Publication Data
US 2015/0312143 A1   Oct. 29, 2015

(30) Foreign Application Priority Data
Dec. 19, 2012 (JP) .................................. 2012-276733

(51) Int. Cl.
*H04L 12/701* (2013.01)
*H04L 12/801* (2013.01)
(Continued)

(52) U.S. Cl.
CPC .......... *H04L 45/38* (2013.01); *H04L 12/6418* (2013.01); *H04L 47/10* (2013.01); *H04L 69/22* (2013.01)

(58) Field of Classification Search
None
See application file for complete search history.

(56) References Cited

U.S. PATENT DOCUMENTS 6,414,962 B1   7/2002   Hall et al.
6,438,119 B1   8/2002   Kim et al.
(Continued)

FOREIGN PATENT DOCUMENTS

CN   1299566 A   6/2001
CN   1410899 A   4/2003
(Continued)

OTHER PUBLICATIONS

Korean Office Action dated Oct. 31, 2016 with a Japanese translation and partial English translation thereof.
(Continued)

*Primary Examiner* — Duc T Duong
(74) *Attorney, Agent, or Firm* — McGinn IP Law Group, PLLC

(57) ABSTRACT

A communication node includes an entry memory capable of retaining a control information entry stipulating a processing to be applied to a packet received, a packet processor referencing the entry memory to process the packet received, and a request suppressing unit. Triggered by reception of a packet, the request suppressing unit requests a preset control apparatus to set a control information entry, and subsequently suppresses control information entry setting requests for a preset time for packets having a characteristic in common with the packet for which the control information entry setting request was made to the preset control apparatus.

14 Claims, 12 Drawing Sheets

(51) Int. Cl.
*H04L 12/947* (2013.01)
*H04L 12/721* (2013.01)
*H04L 12/64* (2006.01)
*H04L 29/06* (2006.01)

(56) References Cited

U.S. PATENT DOCUMENTS

| | | | |
|---|---|---|---|
| 7,499,457 | B1 | 3/2009 | Droux et al. |
| 7,904,961 | B2 | 3/2011 | Ma et al. |
| 8,519,847 | B2 | 8/2013 | Honkanen et al. |
| 8,605,734 | B2 | 12/2013 | Ichino |
| 9,124,526 | B2 | 9/2015 | Ooishi |
| 9,276,852 | B2 | 3/2016 | Akiyoshi |
| 2003/0061306 | A1 | 3/2003 | Kanno et al. |
| 2006/0036733 | A1 | 2/2006 | Fujimoto et al. |
| 2008/0263665 | A1 | 10/2008 | Ma et al. |
| 2008/0309490 | A1 | 12/2008 | Honkanen et al. |
| 2009/0185560 | A1 | 7/2009 | Venkatesan et al. |
| 2010/0088140 | A1 | 4/2010 | Gil et al. |
| 2011/0055921 | A1 | 3/2011 | Narayanaswamy et al. |
| 2011/0261825 | A1 | 10/2011 | Ichino |
| 2011/0286326 | A1 | 11/2011 | Awano |
| 2012/0195318 | A1* | 8/2012 | Numata ............ H04L 41/0856 370/392 |
| 2013/0070762 | A1* | 3/2013 | Adams ............... H04L 49/70 370/389 |
| 2013/0163602 | A1* | 6/2013 | Kang ................. H04L 12/56 370/400 |
| 2013/0170503 | A1 | 7/2013 | Ooishi |
| 2013/0176888 | A1* | 7/2013 | Kubota .............. H04L 45/38 370/252 |
| 2013/0223444 | A1* | 8/2013 | Liljenstolpe ......... H04L 61/103 370/392 |
| 2013/0250799 | A1* | 9/2013 | Ishii ................. H04L 47/12 370/252 |
| 2013/0259052 | A1 | 10/2013 | Akiyosh |
| 2013/0282867 | A1 | 10/2013 | Otake |
| 2013/0301658 | A1* | 11/2013 | Chiba ............... H04L 49/3009 370/503 |
| 2014/0341019 | A1* | 11/2014 | Yamagata ............. H04L 47/32 370/230 |
| 2014/0341219 | A1* | 11/2014 | Sonoda ............... H04L 47/125 370/392 |
| 2016/0330113 | A1* | 11/2016 | Chiba ................. H04L 45/38 |

FOREIGN PATENT DOCUMENTS

| | | |
|---|---|---|
| CN | 1731784 A | 2/2006 |
| CN | 101291323 A | 10/2008 |
| CN | 101340276 A | 1/2009 |
| CN | 101416176 A | 4/2009 |
| CN | 101465865 A | 6/2009 |
| CN | 102014116 A | 4/2011 |
| CN | 102045308 A | 5/2011 |
| EP | 1 216 553 B1 | 1/2006 |
| JP | 2011-146982 A | 7/2011 |
| JP | 2011-166384 A | 8/2011 |
| RU | 2 216 101 C2 | 11/2003 |
| RU | 2 409 896 C2 | 1/2011 |
| WO | WO 99/41853 | 8/1999 |
| WO | WO 2007/060494 A1 | 5/2007 |
| WO | WO 2010/042439 A2 | 4/2010 |
| WO | WO 2010/103909 A1 | 9/2010 |
| WO | 2011/083846 A1 | 7/2011 |
| WO | WO 2012/049925 A2 | 4/2012 |
| WO | WO 2012/090355 A1 | 7/2012 |
| WO | WO 2012/090996 A1 | 7/2012 |

OTHER PUBLICATIONS

Daisuke Kotani et al., "Packet-In Message Control for Reducing CPU Load and Control Traffic in OpenFlow Switches", 2012 European Workshop on Software Defined Networks, Oct. 25-26, 2012.
Chinese Office Action dated Mar. 2 2017 with an English translation thereof.
Extended European Search Report dated Aug. 19, 2016.
International Search Report (ISR) (PCT Form PCT/ISA/210), in PCT/JP2013/083843, dated Apr. 1, 2014.
Nick McKeown et al., "OpenFlow: Enabling Innovation in Campus Networks", [online], [searched on Nov. 24, Heisei24 (2012), Internet URL:http://www..openflow.org/documents/openflow-wp-latest.pdf.
"OpenFlow Switch Specification", Version 1.3.1 (Wire Protocol Ox04), [online], [searched on Dec. 11, Heisei24 (2012), Internet URL:https://www.opennetworking.org/images/stories/downloads/specification/openflow-spec-v1.3.1.pdf.
Daiske Kotani et al., "A method of Controlling Packet-In Messages in OpenFlow Switches for Reducing Loads of Switches and Control Networks," IEICE Technical Report (Technical Report of IEICE), vol. 112, No. 212, Sep. 14, 2012 (Sep. 14, 2012), pp. 31-36.
Russian Office Action dated Oct. 3, 2016 with an English translation thereof.
Chinese Office Action dated Oct. 26, 2017 in Chinese Application No. 201380067016.8 with an English translation thereof.

* cited by examiner

FIG.2

| MATCH CONDITIONS | INSTRUCTIONS |
|---|---|
| DESTINATION IP ADDRESS = SERVER A | Drop (ADDED) |
| DESTINATION IP ADDRESS = SERVER B | Output port#1 |
| .. | .. |

FIG.4

| PRIORITY LEVELS | MATCH CONDITIONS | INSTRUCTIONS |
|---|---|---|
| HIGH PRIORITY | TRANSMISSION SOURCE IP ADDRESS = SERVER B | Output port#1 |
| ... | ... | ... |
| ... | ... | ... |
| ... | ... | ... |
| LOW PRIORITY | All Any | Output OFC |

FIG.6

| PRIORITY LEVEL | MATCH CONDITIONS | INSTRUCTIONS |
|---|---|---|
| HIGH PRIORITY | TRANSMISSION SOURCE IP ADDRESS = SERVER B | Output port#1 |
| HIGH PRIORITY | TRANSMISSION SOURCE IP ADDRESS = SERVER A ←ADDED | Drop |
| ... | ... | ... |
| ... | ... | ... |
| ... | ... | ... |
| LOW PRIORITY | All Any | Output OFC |

FIG.9

| MATCH CONDITIONS | TIMER |
|---|---|
| TRANSMISSION SOURCE IP ADDRESS = SERVER A | 00 : 00 : 00 |
| ... | ... |
| ... | ... |
| ... | ... |

COMMUNICATION NODE, CONTROL APPARATUS, COMMUNICATION SYSTEM, PACKET PROCESSING METHOD, COMMUNICATION NODE CONTROLLING METHOD AND PROGRAM

DESCRIPTION OF RELATED APPLICATION

The present application asserts priority rights based on JP Patent Application 2012-276733 filed in Japan on Dec. 19, 2012, the total contents thereof being incorporated by reference into the present application.

TECHNICAL FIELD

This invention relates to a communication node, a control apparatus, a communication system, a packet processing method, a communication node controlling method and a program. More particularly, it relates to a communication node, a control apparatus, a communication system, a packet processing method, a communication node controlling method and a program, in which a packet is processed in accordance with contents obtained on making an inquiry at the control apparatus.

BACKGROUND

A technique known as OpenFlow has been proposed in Patent Literatures 1 to 3 and in Non-Patent Literatures 1, 2. The OpenFlow comprehends communication as an end-to-end flow and manages path control, recovery from malfunctions, load balancing and optimization on the flow-by-flow basis. An OpenFlow switch, specified in Non-Patent Literature 2, includes a secure channel over which to communicate with an OpenFlow controller, and operates in accordance with a flow table an addition to or a rewriting in which is instructed from time to time from the OpenFlow controller. In the flow table, a set of match conditions (Match Fields) to be matched against a packet header, flow statistics information (Counters) and instructions that define the processing contents (Instructions) is defined from one flow to the next. See '5.2 Flow Table' of Non-Patent Literature 2.

On receipt of a packet, the OpenFlow switch searches from the flow table an entry having the match condition conforming to the header information of the received packet. See '5.3 Matching' of Non-Patent Literature 2. If, as a result of the search, the entry matched to the received packet is found, the OpenFlow switch updates the flow statistics information (Counter), at the same time as it executes processing contents stated in an instruction field of the matched entry, such as packet transmission at a specified port, flooding or dropping. If conversely no entry matched to the received packet is found, the OpenFlow switch sends an entry setting request, that is, a request for transmission of the control information to process the control information (Packet-In message), to the OpenFlow controller over the secure channel. The OpenFlow switch receives the flow entry, in which processing contents are stated, and updates the flow table. In this manner, the OpenFlow switch uses the entry, stored in the flow table, as the control information, in order to forward the packet.

Patent Literature 1

Reissued WO2010/103909

Patent Literature 2

Japanese Patent Kokai Publication No. JP2011-166384A

Patent Literature 3

Japanese Patent Kokai Publication No. JP2011-146982A

NON-PATENT LITERATURE

Non-Patent Literature 1

Nick McKeown and three others: "OpenFlow: Enabling Innovation in Campus Networks", [online], [searched on November 24, Heisei24 (2012), Internet URL: http://www.openflow.org/documents/openflow-wp-latest.pdf Non-Patent Literature 2

"OpenFlow Switch Specification", Version 1.3.1 (Wire Protocol 0x04), [online], [searched on December 11, Heisei24 (2012), Internet URL: https://www.opennetworking.org/images/stories/downloads/specification/openflow-spec-v1.3.1.pdf

SUMMARY

The following analysis is given by the present invention. In case there is no entry in a flow table of an OpenFlow switch matching to the header information of a received packet, the OpenFlow switch requests a control apparatus, termed an OpenFlow controller, to set a flow entry in the switch, that is, to send the control information (Packet-In message) thereto. This is shown in the Patent Literatures 1 through to 3 and in Non-Patent Literatures 1, 2. In case it is instructed, in an entry found out as a result of flow table search, that a request is to be made to the OpenFlow controller to set a flow entry, the OpenFlow switch likewise requests the OpenFlow controller to set the flow entry.

Thus, if larger numbers of packets, consistent with the condition of making flow entry setting requests as described above, are received, the OpenFlow switch makes a flow entry setting request to the OpenFlow controller each time such packet is received. As a result, such a problem may arise in which the above described situation pressures the band of a secure channel provided between the OpenFlow switch and the OpenFlow controller. In addition, if the OpenFlow controller takes charge of larger numbers of the OpenFlow switches, another problem may also arise in which the load on the OpenFlow controller increases to deteriorate e.g., the response performance. By the way, it is stated in '6. OpenFlow Channel' of Non-Patent Literature 2 that the secure channel uses TLS over TCP (Transport Layer Security over Transmission Control Protocol).

It is an object of the present invention to provide a communication node, a control apparatus, a communication system, a packet processing method, a communication node controlling method and a program which will contribute to solution of a variety of problems derived from sending a control information entry setting request triggered by reception of a preset packet according to the technique termed the OpenFlow.

In a first aspect, there is provided a communication node comprising an entry memory capable of retaining a control information entry stipulating a processing to be applied to a packet received, a packet processor referencing the entry memory to process the packet received, and a request suppressing unit. Triggered by reception of a packet, the request suppressing unit requests a preset control apparatus to set the control information entry and subsequently suppresses a control information entry setting request(s) for a preset time for such packet(s) having a characteristic in common with the packet for which the control information entry setting request was made to the preset control apparatus.

In a second aspect, there is provided a control apparatus that controls a communication node including an entry memory capable of retaining a control information entry stipulating a processing to be applied to a packet received and a packet processor referencing the entry memory to process the packet received. The control apparatus includes a request suppressing unit that suppresses a control information entry setting request(s) from a controller of the communication node for a preset time as concerns a packet(s) having a characteristic in common with the packet for which the control information entry setting request was made from the communication node.

In a third aspect, there is provided a communication system comprising a control apparatus that causes a control information entry to be set in a pertinent communication node in response to a control information entry setting request from a communication node, and the communication node(s). The communication node includes an entry memory capable of retaining the control information entry that stipulates a processing to be applied to a packet received, a packet processor that references the entry memory to process the packet received, and a request suppressing unit. Triggered by reception of a packet, the request suppressing unit requests a preset control apparatus to set the control information entry and subsequently suppresses a control information entry setting request(s) for a preset time for such packet(s) having a characteristic in common with the packet for which the control information entry setting request was made to the preset control apparatus.

In a fourth aspect, there is provided a method for processing a packet comprising requesting, in response to reception of a first packet, for which a control information entry setting request is to be made to a preset control apparatus, the preset control apparatus to set a control information entry, and dropping a second packet received within a preset time as from reception of the first packet in case the second packet has a characteristic in common with the first packet. The present method is bound up with a specified machine which is a communication node that references the control information entry to process the packet.

In a fifth aspect, there is provided a method for controlling a communication node(s) comprising: a control apparatus configured to control the communication node(s) setting a control information entry in a pertinent communication node in response to a control information entry setting request from the communication node; and the control apparatus controlling the communication node so as to suppress the control information entry setting request(s) for a preset time as concerns a packet(s) having a characteristic in common with the packet for which the control information entry setting request was made. The present method is bound up with a particular machine which is a control apparatus that controls the communication node.

In a sixth aspect, there is provided a program for implementing the functions of the above mentioned communication node or control apparatus. It is noted that the program may be recorded on a computer-readable non-transient recording medium. That is, the present invention may be implemented as a computer program product.

The present invention may contribute to solution of problems derived from transmission of a control information entry setting request triggered by reception of a preset packet.

BRIEF DESCRIPTION OF THE DRAWINGS

FIG. 2 is a table for illustrating the operation of the exemplary embodiment.

FIG. 4 is a table showing an example flow entry retained by a flow table of a communication node according to the exemplary embodiment 1.

FIG. 6 is a table showing an example flow entry added to a flow table by a controller of the communication node of the exemplary embodiment 1.

FIG. 9 is a table showing an example configuration of a suppressive cache of a communication node of the exemplary embodiment 2.

PREFERRED MODES

A summary of a preferred mode of the present disclosure will now be described with reference to the drawings. It is noted that symbols are entered in the summary merely as examples to assist in understanding and are not intended to limit the present disclosure to the mode illustrated.

Figure 1:
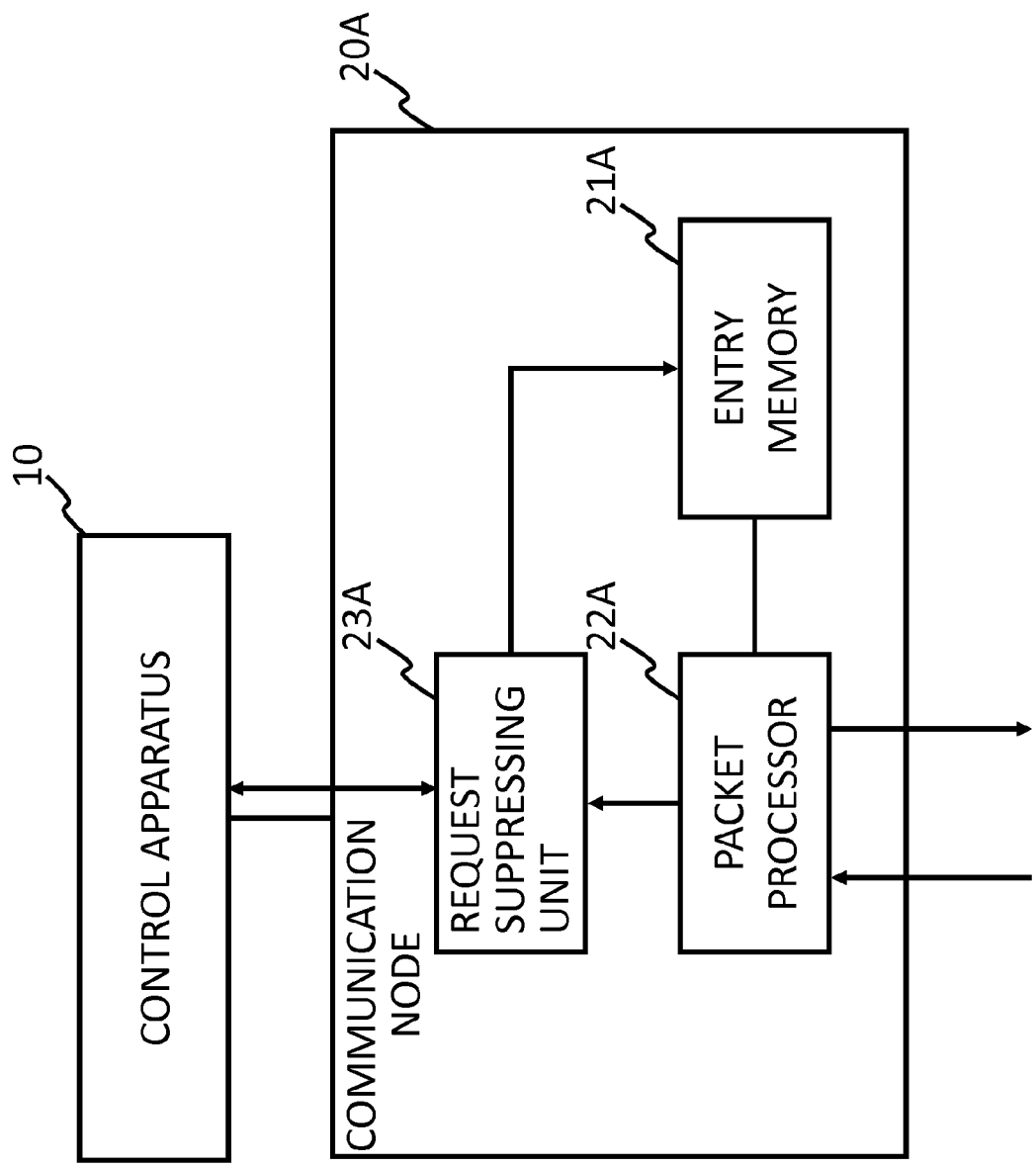
FIG. 1 is a block diagram showing a configuration of an exemplary embodiment.

In a mode, the present disclosure may be implemented by a control apparatus 10 and a communication node(s) 20A, as shown in FIG. 1. The control apparatus 10 sets, in a pertinent communication node, a flow entry (a control information entry) stipulating the processing to be applied to a received packet, in response to a request from the communication node 20A for setting the flow entry therein. The communication node references the flow entry, as set by the control apparatus 10, so as to process the packet.

More specifically, the communication node 20A includes an entry memory 21A, capable of holding the flow entry or entries, a packet processor 22A that references the entry memory 21A to process a packet received, and a request suppressing unit 23A. The request suppressing unit 23A operates, after requesting the control apparatus to set a flow entry, with reception of a packet as a clue, so as to suppress a flow entry setting request(s) for a preset time as concerns a packet(s) having a characteristic(s) in common with the packet for which the flow entry setting request was made to the preset control apparatus.

To suppress the request suppressing unit 23A from making the flow entry setting request(s), such a method may be used in which a flow entry (second flow entry) is set in the entry memory 21A, as shown for example in FIG. 2. In this second flow entry, a match condition to capture a packet having a characteristic(s) identical with that of or in common with the packet, for which the control apparatus 10 was requested to set the flow entry, is correlated with an instruction to drop the packet conforming to the match condition. The match condition may, for example, be a destination IP address=an IP address of a server A if a request was already made to set a flow entry as concerns a packet destined to be sent to the server A. To terminate suppression of flow entry setting requests after lapse of a certain preset time, such a scheme may be used in which the time duration elapsed as from the time of setting the second control information entry in the flow entries shown in FIG. 2 is measured and the second control information entry is deleted after lapse of the time duration measured.

Also, in place of setting the second control information entry, such an implementation in which the request suppressing unit 23A filters the flow entry setting requests transmitted from the packet processor 22A may be used. Or, such an implementation may be used in which a cache stated as below retaining a characteristic(s) of a packet for which a flow entry setting request was already made is provided so as to suppress the flow entry setting requests.

Exemplary Embodiment 1

Figure 3:
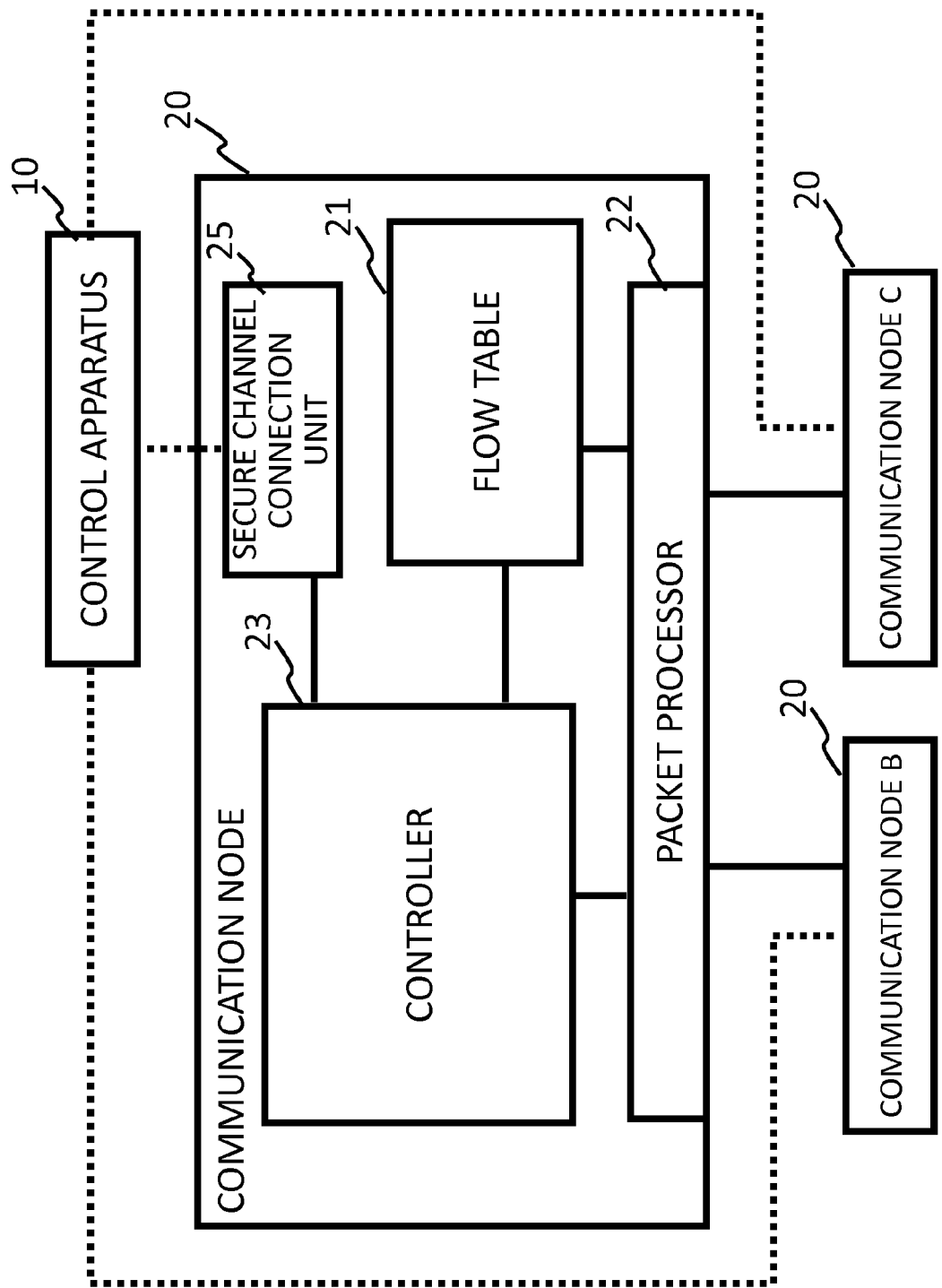
FIG. 3 is a block diagram showing a configuration of an exemplary embodiment 1.

An exemplary embodiment 1 will now be described with reference to the drawings. FIG. 3 shows a configuration of the exemplary embodiment 1. There are shown in FIG. 3 a communication node 20, connected to a communication node B and a communication node C, and a control apparatus 10 that controls the communication nodes 20 over a secure channel indicated by broken lines in FIG. 3.

The control apparatus 10 is such apparatus that controls the communication node 20 by setting a flow entry in a flow table of the communication node. As such control apparatus, an OpenFlow controller, disclosed in the Non-Patent Literatures 1, 2, can be used as an example.

The communication node 20 includes a flow table 21, a packet processor 22, a controller 23 and a secure channel connection unit 25. Such communication node 20 may, besides the OpenFlow switch of the Non-Patent Literatures 1, 2, be a personal computer or a smartphone provided with a function of processing a packet entered to or output from an upper order application layer as an example.

The flow table 21 is such a table holding a flow entry or entries in which the match condition for identifying a packet being processed is correlated with the packet conforming to the match condition.

FIG. 4 shows example flow entries to be retained by the flow table 21. In the example flow entries, shown in FIG. 4, priority levels, match conditions and instructions, as processing contents, are correlated with one another. The 'priority level' is referred to for selecting a flow entry in case the match condition of each of a plurality of flow entries conforms to the packet received. For example if, in the case of FIG. 4, the communication node 20 has received a packet a transmission source IP address of which is an IP address of a server B and which is destined to be sent to a server B, search is made, as a result of which a 'high priority' flow entry at the upper most field and the flow entry at the lower most field with the 'match condition=All Any' are selected as candidates. In this case, the priority levels of the two are compared to each other and the upper most flow entry of 'High Priority Level' is selected. If, on the other hand, the communication node 20 has received a packet destined to be sent to a server A, the lower most field flow entry in the flow table 21 of FIG. 4 is selected, and a request is made for setting the flow entry to the control apparatus 10 (Output OFC (=OpenFlow Controller)).

The packet processor 22 processes a packet received by referencing the flow table 21 in which there are stored the above mentioned flow entries.

It is now assumed that a number of flow entry setting requests to the control apparatus 10 were made by the packet processor 22 over the secure channel connection unit 25. In this case, the controller 23 sets in the flow table 21 a flow entry that causes dropping of such a packet that has a priority level higher than at least the flow entry for which a flow entry setting request is to be made to the control apparatus 10 (the flow entry of 'low priority level' at the lower most field in FIG. 6) and that has the same header information as that of the packet for which the flow entry setting request was made to the control apparatus 10. A timeout value is set in this flow entry, such that, after lapse of a preset time, the flow entry is automatically deleted.

The secure channel connection unit 25 performs the processing of transmitting a flow entry setting request to the control apparatus 10 or the processing of receiving a flow entry setting message from the control apparatus 10 to deliver the message received to the controller 23. It is noted that an OpenFlow protocol disclosed in Non-Patent Literature 2 may be used in exchanging the control message or the request between the communication node 20 and the control apparatus 10.

Although the specified components of the communication nodes B, C are not shown in detail in FIG. 3, the components of these communication nodes B, C may be the same as those of the communication node 20.

Figure 5:
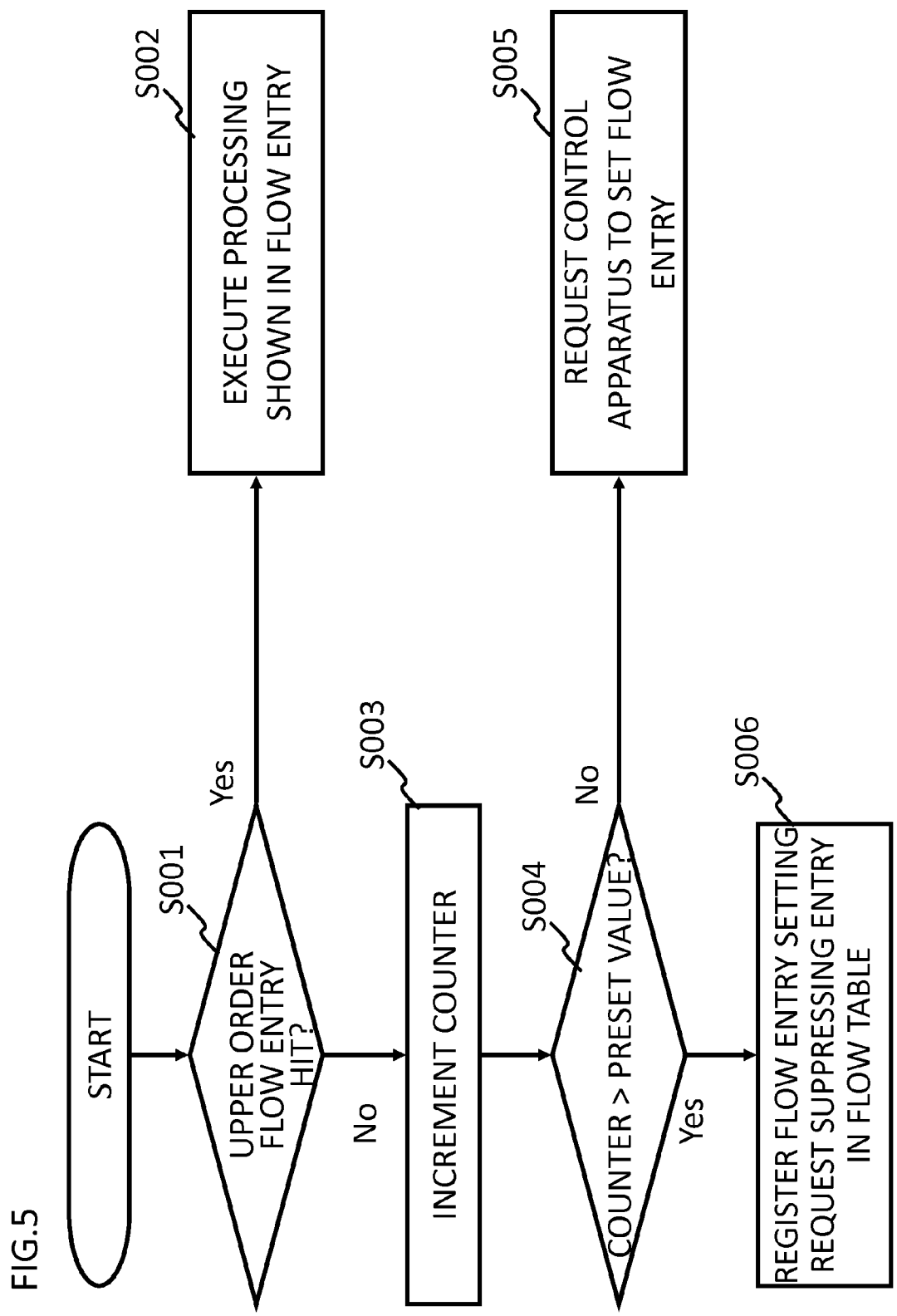
FIG. 5 is a flowchart showing the operation of a communication node of the exemplary embodiment 1.

The operation of the present exemplary embodiment will now be described in detail with reference to the drawings. FIG. 5 depicts a flowchart showing the operation at the time of reception of a packet at the communication node 20 in the exemplary embodiment 1. Referring to FIG. 5, the communication node 20 references the flow table 21 to search for an upper order (higher priority) flow entry having a match condition(s) conforming to the received packet (step S001). If the upper order (higher priority) flow entry has been found, the communication node executes the processing contents stated in an instruction field of the flow entry, such as packet forwarding at a specified port or header rewriting (step S002).

If, as a result of search at the flow table 21, no upper order (higher priority) flow entry has been found, the communication node 20 increments a counter provided in for example the controller 23 (step S003).

The communication node 20 then decides whether or not the value of the counter has exceeded a preset value (step S004). If the counter value is not more than the preset value (No of the step S004), the communication node 20 sends the received packet to the control apparatus 10 to request the control apparatus to set a flow entry (step S005).

If the counter value exceeds the preset value (Yes of the step S004), the communication node 20 registers a flow entry setting request suppressing flow entry (a flow entry suppressing a flow entry setting request) in the flow table 21 (step S006). It is noted that the counter value is cleared when a preset time has elapsed or when the state where a flow entry setting request is not made has continued for a preset time FIG. 6 depicts a flow table in which there is registered, by the controller of the communication node according to the exemplary embodiment 1, an example setting request suppressing flow entry, indicated by a broken line. If, for example, no upper order flow entry having the match condition conforming to the packet received from the server A has been set in the flow table 21, the communication node 20 increments the counter and requests the control apparatus 10 to set a flow entry. Thereafter, if, before the flow entry to process the packet received from the server A is sent from the control apparatus 10, a preset number of packets has been received from the server A, the communication node 20 sets a flow entry shown at a second row from above of the flow table of FIG. 6. As shown therein, this flow entry is such a one that instructs dropping the packet in which the transmission source IP address is the server A (setting request suppressing flow entry). In this manner, the processing of dropping the packet(s), whose transmission source IP address is the server A's IP address, is carried out for a certain time. Of course, if the packet received is a packet belonging to a different flow, for example, a packet whose transmission source IP address is a server B's IP address, the packet is forwarded in accordance with the upper most row flow entry of FIG. 6. If a packet received is an unknown one whose transmission source IP address is a server C, as an example, it is a target packet of the setting request suppressing flow entry and remains so until such time the counter is cleared. Hence, the packet is dropped.

Figure 7:
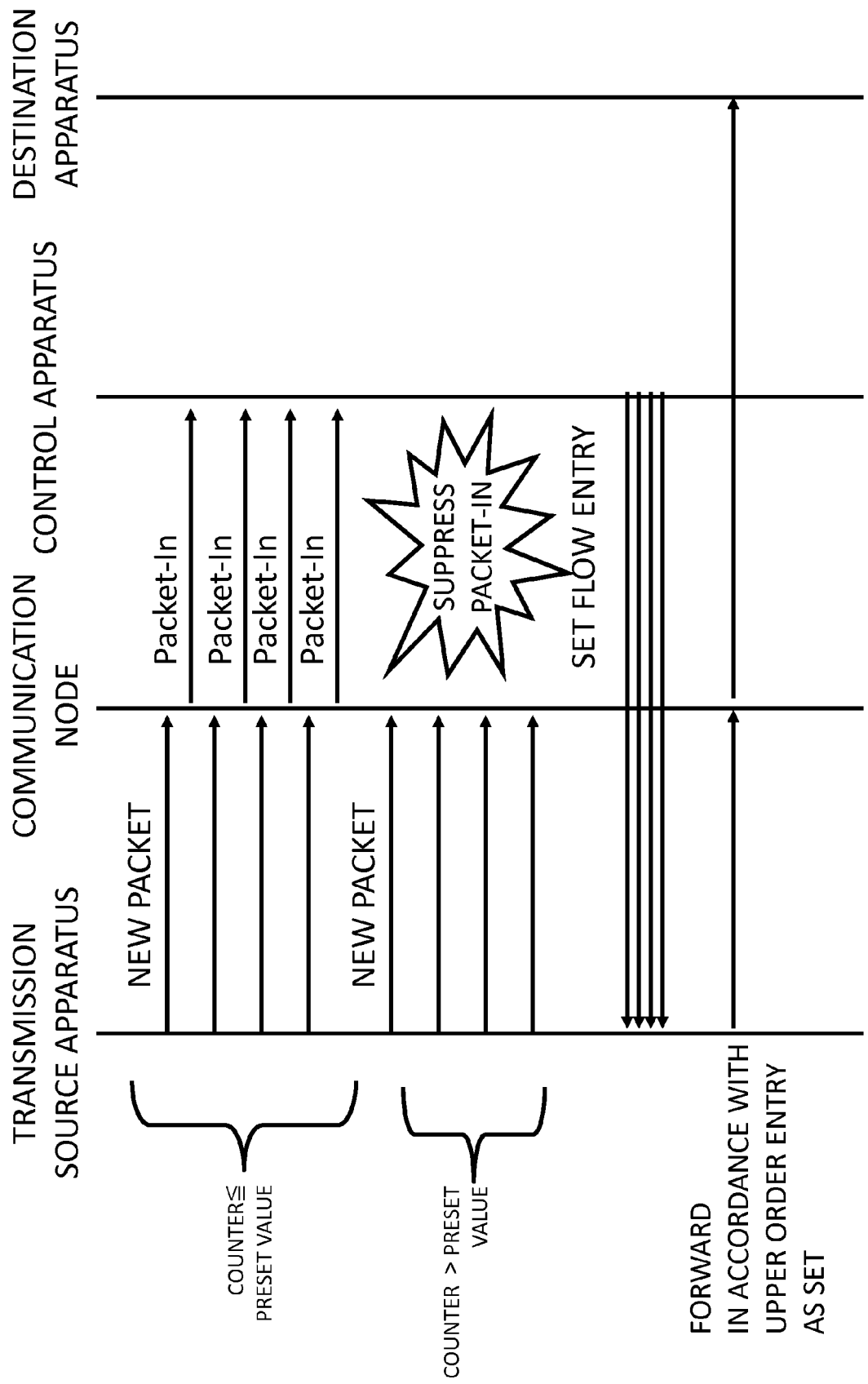
FIG. 7 is a sequence diagram showing a global operation of the exemplary embodiment 1.

FIG. 7 depicts a sequence diagram showing the global operation of the exemplary embodiment 1. For example, if a new packet devoid of a corresponding flow entry in the flow table 21 is received from an apparatus of the transmission source, such as another communication node, terminal or server, the communication node 20 requests the control apparatus 10 to set a flow entry (Packet-In of FIG. 7).

Thereafter, if a count value of the counter has exceeded a preset value, the communication node 20 registers, in the flow table 21, a flow entry that causes dropping of those packets for each of which flow entry setting was already requested to the control apparatus 10 (setting request suppressing flow entry). Thereafter, even if the communication node 20 should receive a packet(s), for which the flow entry setting request was already made, the communication node causes such packet(s) to be dropped based on the setting request suppressing flow entry. This suppresses flow entry setting requests for a certain time interval. If thereafter a flow entry setting message is sent from the control apparatus 10, the communication node 20 sets the flow entry in the flow table 21. Thereafter, the packet(s) is processed in accordance with the flow entry sent from the control apparatus 10 so as to be forwarded to a destination apparatus.

In the subject exemplary embodiment, described above, the frequency with which the flow entry setting requests are issued to the control apparatus 10 may be diminished to avoid pressuring the secure channel. Moreover, the load on the control apparatus 10 per communication node may be suppressed, so that it becomes possible to increase the number of communication nodes that may be handled by the control apparatus 10.

In addition, in the above described exemplary embodiment 1, a preset number of times of flow entry setting requests is allowed through use of the counter, so that, even if no flow entry setting request has reached the control apparatus 10 by some or other reason, the request may get to the control apparatus 10 by a second request, a third request and so on. By doing as described above, a flow entry for a set of a plurality of packets can also be set in the control apparatus 10.

Of course, if the above mentioned precautions are unnecessary, the value for comparison to the count value of the counter may be set to 1 for a case where the initial value of the counter is 0. In this case, the packet(s) for which the flow entry setting request has once been made is dropped, beginning from the next time packet, thus appreciably decreasing the load otherwise imposed on the control apparatus 10.

Exemplary Embodiment 2

An exemplary embodiment 2, which has modified the above described exemplary embodiment 1, will now be described with reference to the drawings. In the subject exemplary embodiment 2, a dedicated cache is provided in place of registering a setting request suppressing flow entry in the flow table 21. The dedicated cache is used for deciding whether or not a packet is a target for a flow entry setting request. Since the subject exemplary embodiment is otherwise similar in configuration to the exemplary embodiment 1, the following description is centered about this point of difference from the exemplary embodiment 1.

Figure 8:
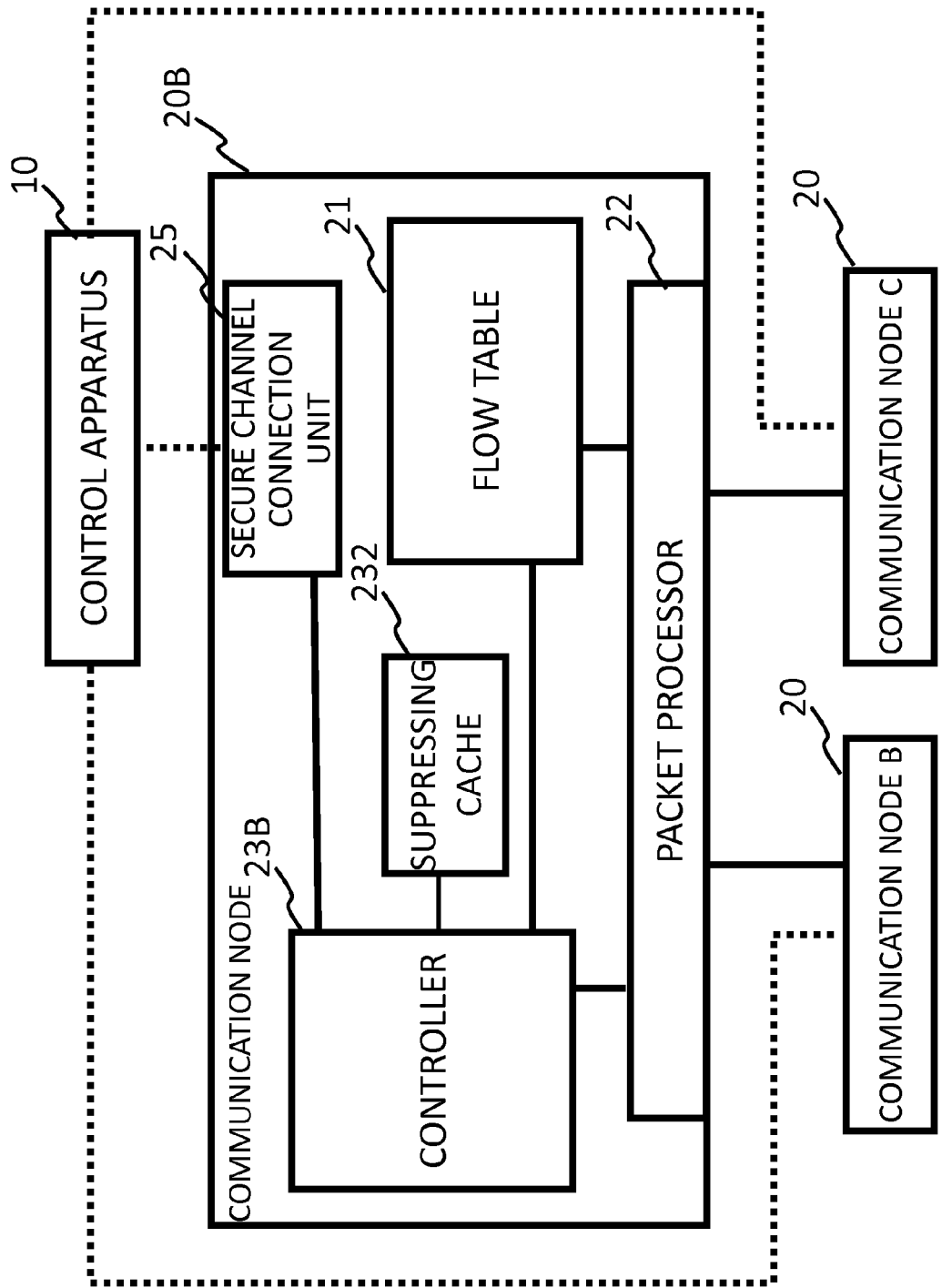
FIG. 8 is a block diagram showing a configuration of an exemplary embodiment 2.

FIG. 8 depicts a configuration of the exemplary embodiment 2. The subject exemplary embodiment 2 differs from the exemplary embodiment 1, shown in FIG. 3, in that a suppressing cache 232 connecting to the controller 23B is provided, and in that, as a result of providing the suppressing cache, the operation of the controller 23B differs from that of the exemplary embodiment 1.

Referring to FIG. 9, the suppressing cache 232 is made up of a memory etc. capable of holding, for a preset time, an entry showing the correlation between a match condition and a timer field. The entry can be maintained for a preset time. The match condition uses e.g. the header information of a packet for which a flow entry setting request was made in order to discriminate the packet for which the flow entry setting request was made. The timer field indicates the time elapsed as from start of initiating the suppressive processing subject to the match condition.

In place of setting the setting request suppressing flow entry in the flow table 21 as in the exemplary embodiment 1, the controller 23B of the subject exemplary embodiment executes flow entry setting request suppressive processing by referencing the suppressing cache 232. Specifically, before making a request to the control apparatus 10 for setting a flow entry for the received packet, the controller 23B checks to see if the received packet conforms to the match condition registered in the suppressing cache 232. If the received packet conforms to the match condition registered in the suppressing cache 232, the received packet is dropped.

The controller 23B of the subject exemplary embodiment also performs the processing of deleting the entry which is retained by the suppressing cache 232 and the timer field value of which has exceeded a preset time. This allows controlling the time interval of suppression of the flow entry setting request from one flow to another.

In the subject exemplary embodiment, as in the exemplary embodiment 1, it is possible to remove problems such as pressuring of the secure channel or the necessity of restricting the number of communication nodes that can be handled by the control apparatus 10. Moreover, in the subject exemplary embodiment, in which it is unnecessary to register the setting request suppressing flow entry in the flow table 21, the flow table retained by the communication node 20 may effectively be used for its intrinsic purpose, that is, for controlling the forwarding of the packets.

It is noted that, although the configuration of providing a timer field in each entry is shown in the example of FIG. 9, such a method may also be used in which the suppressing cache is cleared in its entirety after lapse of a preset time.

Exemplary Embodiment 3

An exemplary embodiment 3, which is a combination of the above described exemplary embodiments 1 and 2, will now be described with reference to the drawings. In the subject exemplary embodiment 3, the registration of the setting request suppressing flow entry in the flow table 21 of the exemplary embodiment 1 and the suppression of the flow entry setting requests by the suppressing cache 232 of the exemplary embodiment 2 are combined together in a more desirable manner. The configuration as well as the operation of the subject exemplary embodiment is otherwise the same as that of the exemplary embodiments 1 and 2, and hence the following description is centered about the point of difference of the subject exemplary embodiment from the exemplary embodiments 1, 2.

Figure 10:
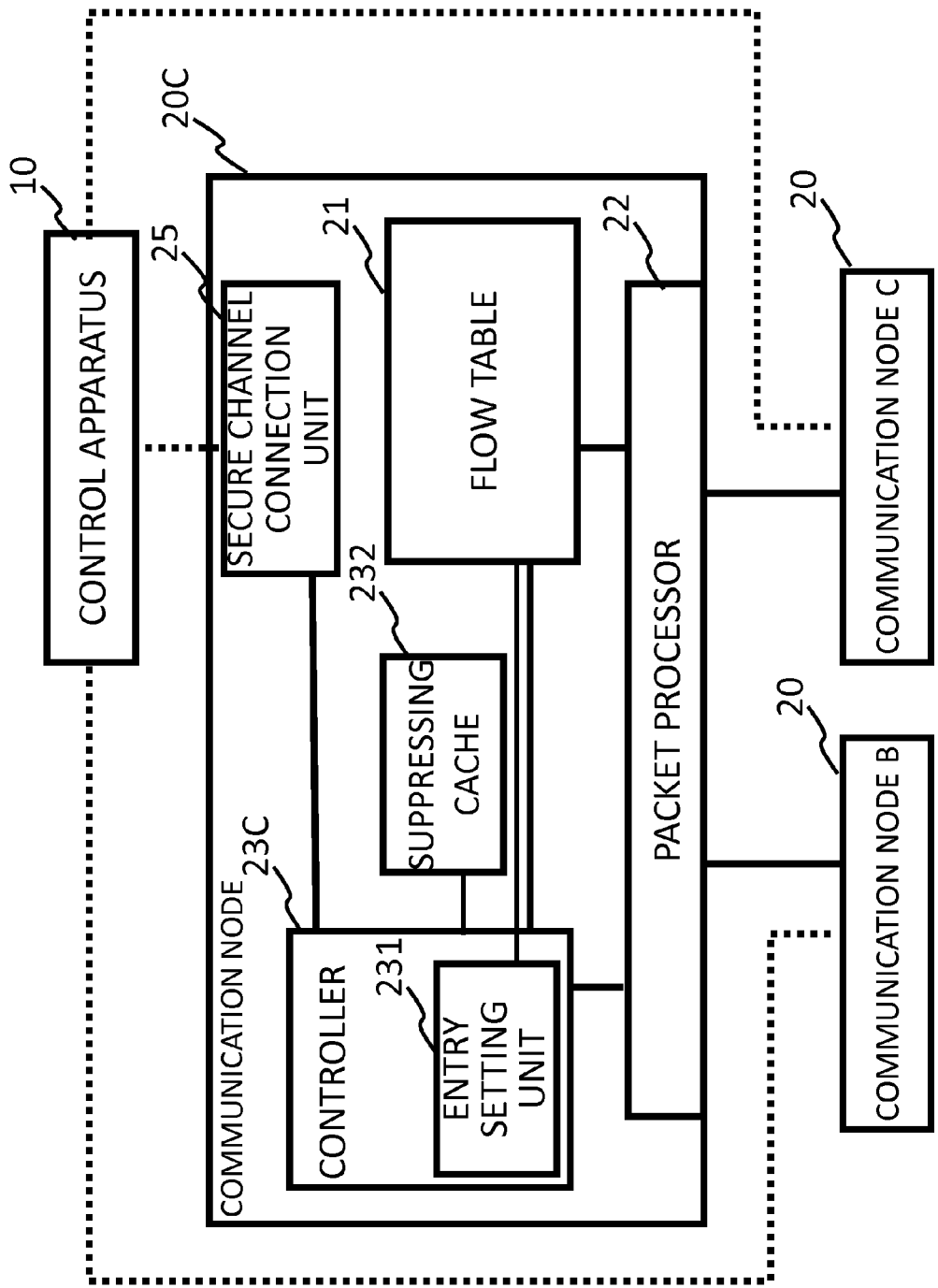
FIG. 10 is a block diagram showing a configuration of an exemplary embodiment 3.

FIG. 10 shows a configuration of the exemplary embodiment 3. The point of difference from the exemplary embodiment 2 shown in FIG. 8 is that an entry setting unit 231 is provided within a controller 23C, such that, when the suppressing cache 232 is full, registration of a setting request suppressing flow entry in the flow table 21 is commenced. That is, the communication node 20C of the subject exemplary embodiment executes flow entry setting request suppression by the suppressing cache 232 in preference to setting request suppressing entry registration.

In the subject exemplary embodiment, should there be a smaller number of entries that may be retained in the suppressing cache 232 due to hardware restraints etc., such deficiency may be coped with by setting the setting request suppressing flow entry. In addition, since the suppressing cache 232 is provided in the subject exemplary embodiment, the time-out value of deletion of the setting request suppressing flow entry may be shorter than in the exemplary embodiment 1. It is thus possible to reduce the time during which the setting request suppressing flow entry remains registered in the flow table 21 even though the condition for flow request suppression has become valid.

Exemplary Embodiment 4

An exemplary embodiment 4 in which the flow entry setting request suppressing function is provided on the control apparatus side will now be described with reference to the drawings.

Figure 11:
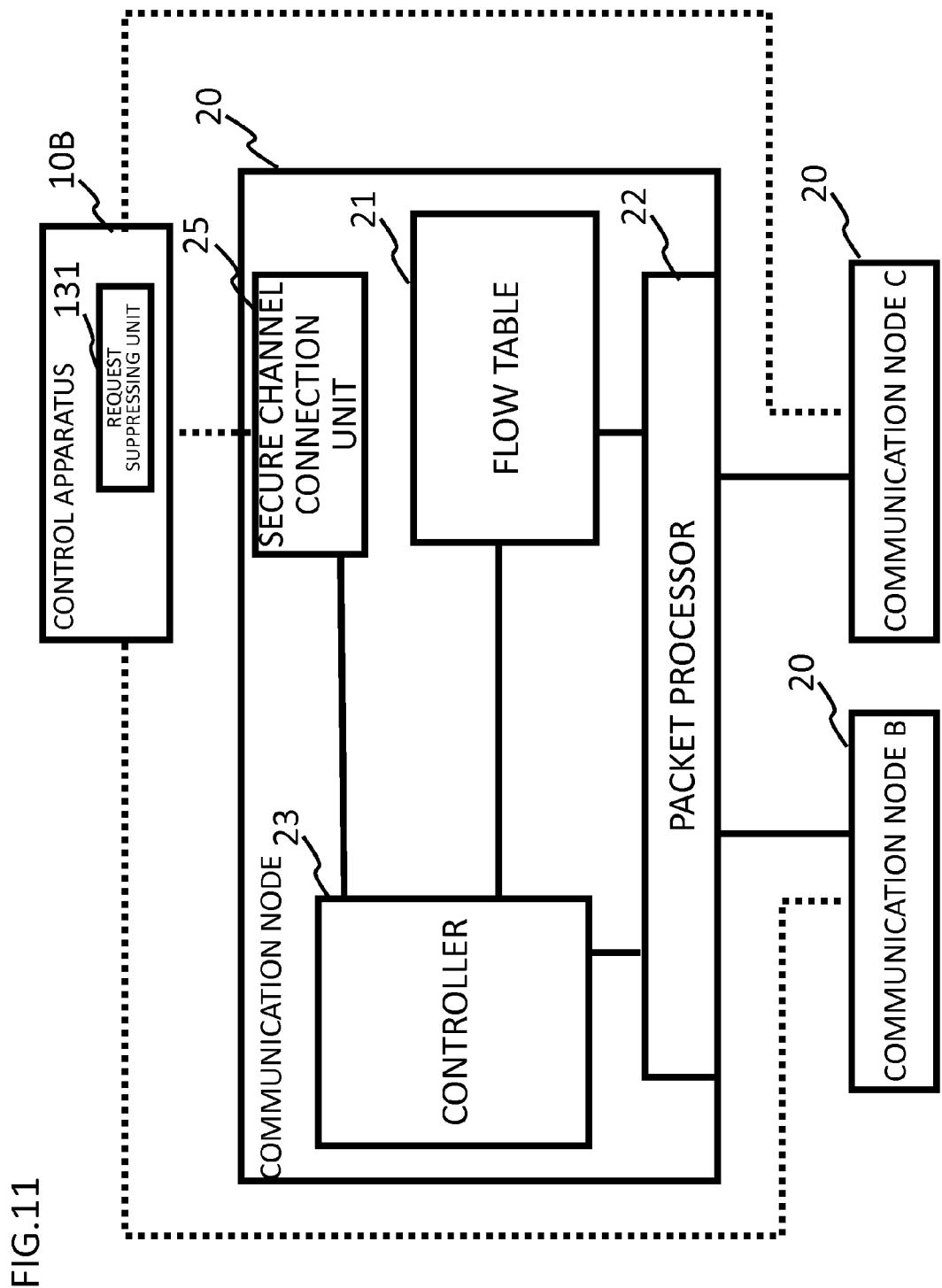
FIG. 11 is a block diagram showing a configuration of an exemplary embodiment 4.

FIG. 11 shows the configuration of an exemplary embodiment 4. The subject exemplary embodiment differs from the exemplary embodiment 1 shown in FIG. 3 in including, on the control apparatus 10B side, a request suppressing unit 131 which is configured for setting a setting request suppressing flow entry in the flow table 21 of the communication node 20 based on a packet for which a flow entry setting request was made from the communication node 20.

It is an advantage of the subject exemplary embodiment that flow entry setting requests can be suppressed without the necessity of providing the function of registering the setting request suppressing flow entries or providing the suppressing cache 232 on the communication node 20 side. It is also an advantage of the subject exemplary embodiment that setting of the setting request suppressing flow entries may be made on the control apparatus 10B side from the perspective of controlling the entire system. For example, such setting request suppressing flow entry can be set that will be able to suppress flow entry setting requests not only for a packet for which a flow entry setting request was made from the communication node 20 but also for a packet anticipated to be received by the communication node 20 in time to come. In such case, it is possible for the control apparatus 10B to aggregate setting request suppressing flow entries using a wildcard as a matching condition for the setting request suppressing flow entries.

Moreover, in the subject exemplary embodiment, the control apparatus 10B is able to discriminate the communication necessary for the control apparatus itself as well as for global system control. Hence, the packets, the flow entry setting requests for which were received from the communication node 20, do not have to be unanimously the targets of flow entry setting request suppression. That is, the communication that is necessary may be exempted from becoming the target of flow entry setting request suppression.

In the subject exemplary embodiment, the request suppressing unit 131 may be provided with a counter, as in the exemplary embodiment 1, so that, after the number of packets, for which the flow entry setting requests were received from the communication node 20, has reached a preset value, setting of the setting request suppressing flow entry will be initiated.

Figure 12:
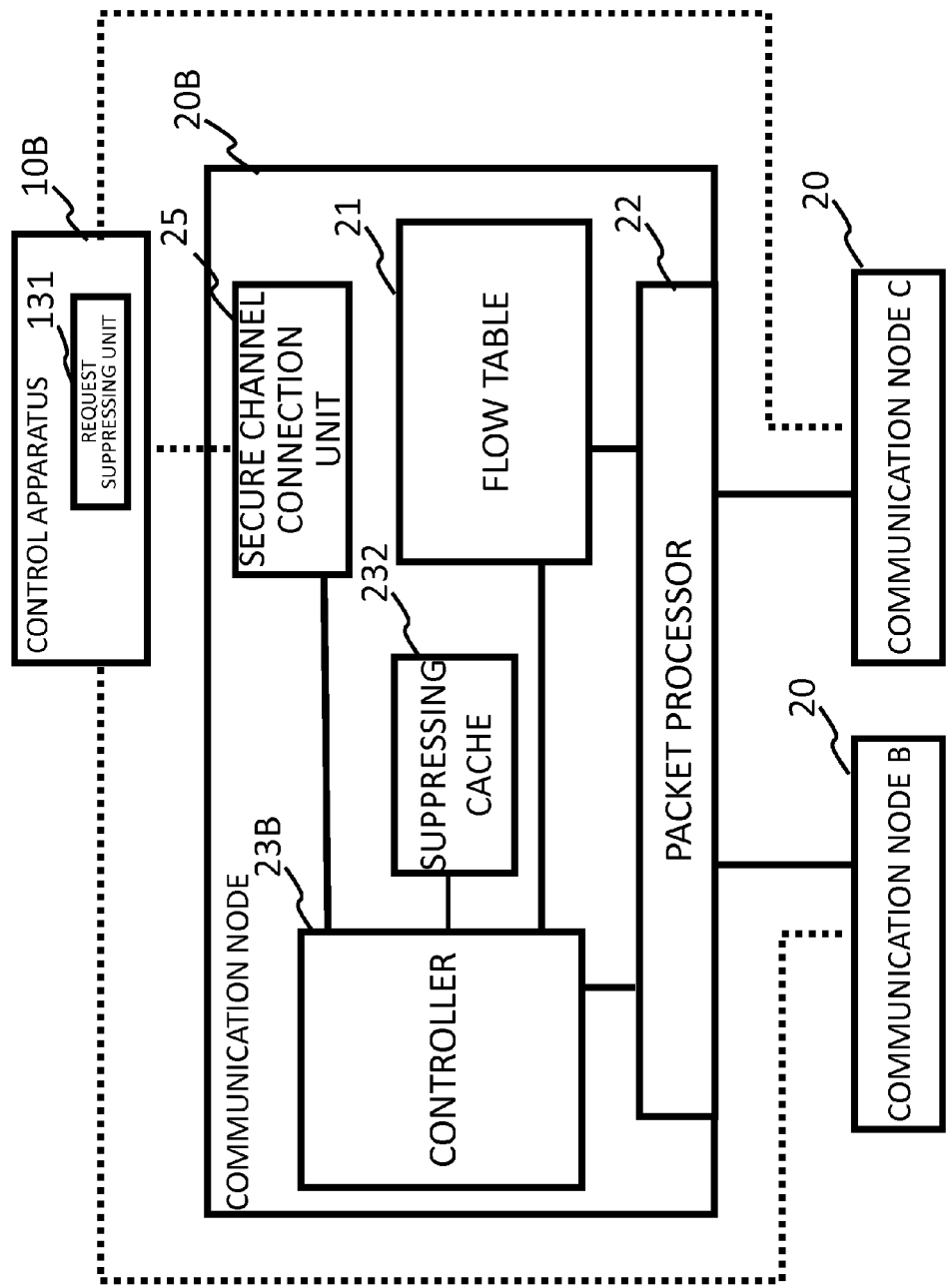
FIG. 12 is a block diagram showing a modification of the exemplary embodiment 4.

FIG. 12 shows a modification of the exemplary embodiment 4. The configuration of the subject exemplary embodiment differs from that of FIG. 11 in including the suppressing cache 232 in the communication node 20B. In the configuration of FIG. 12, even in case the number of the entries that may be retained in the suppressing cache 232 is small due to hardware constraints, such deficiency may be coped with by setting the setting request suppressing flow entry, as stated in connection with the exemplary embodiment 3. It is thus possible to obtain beneficent effects similar to those of the above described other exemplary embodiments.

Moreover, in the configuration of FIG. 12, the setting request suppressing flow entries, necessary from the perspective of controlling the entire system, may be prepared and set on the control apparatus 10B side and, as long as the individual events of communication, which may vary diversely in shorter time periods, are concerned, flow entry setting requests may be suppressed by the suppressing cache 232 provided on the communication node 20B side, by way of effecting more flexible management operations.

It is noted that, although certain preferred exemplary embodiments of the present invention are set out above, the present invention is not limited to the exemplary embodiments illustrated, such that further changes, substitutions or adjustments may be made within the range not departing from the basic technical concept of the invention. For example, the configuration of the network or components shown in the drawings is merely illustrative to aid in the understanding of the present invention and is not meant to restrict the present invention to the configurations illustrated.

Also, in the explanation of the above described exemplary embodiments, it is presupposed that the match condition for the setting request suppressing flow entry is prepared based on the packet for which the communication node 20, 20A, 20B or 20C made the flow entry setting request to the control apparatus 10. It is noted that the communication nodes 20, 20A, 20B, 20C or the control apparatus 10B may include the function of aggregating the setting request suppressing flow entries with the use of a wildcard or a mask for the match conditions. For example, the setting request suppressing flow entry may be set so that packets with specified IP addresses or apparently illicit packets are collected together and exempted in their entirety from becoming the subject of flow entry setting request.

It should be noted that various parts (processing means) of the control apparatus and communication nodes, shown in FIG. 3, FIG. 8, FIG. 10, FIG. 11 and FIG. 12, may be implemented by a computer program which causes computers making up the control apparatus or the communication nodes to execute the above mentioned processing operations with the aid of the hardware of the respective computers.

Finally, certain preferred modes of the present invention will be shown by way of summary.

[Mode 1]

(Reference is made to the communication node according to the above mentioned first aspect).

[Mode 2]

The communication node according to mode 1, wherein, the request suppressing unit sets in the entry memory a second control information entry that causes dropping of a packet having a characteristic in common with the packet for which the control information entry setting request was made to the preset control apparatus, so as to suppress the control information entry setting request(s) for a preset time.

[Mode 3]

The communication node according to mode 1 or 2, further comprising:

a suppressing cache that retains information regarding the packet for which the control information entry setting request was made to the preset control apparatus;

the request suppressing unit referencing the suppressing cache to suppress the control information entry setting request(s) to the preset control apparatus.

[Mode 4]

The communication node according to mode 3, wherein, suppression of the control information entry setting request(s) by the suppressing cache is carried out in preference to suppression of the control information entry setting request(s) by setting in the entry memory the second control information entry that causes dropping of the packet(s) having a characteristic in common with the packet for which the control information entry setting request was made to the preset control apparatus.

[Mode 5]

The communication node according to any one of modes 1 to 4, wherein, the request suppressing unit commences an operation of control information entry setting suppression after a number of the packets for which the control information entry setting requests were made to the preset control apparatus has reached a preset value.

[Mode 6]

The communication node according to mode any one of modes 1 to 5, wherein, a wildcard is used in a match condition for the second control information entry that causes dropping of a packet(s) having a characteristic in common with the packet for which the control information entry setting request was made to the preset control apparatus, whereby a packet(s) other than the packet that triggered the control information entry setting request is also dropped for a preset time.

[Mode 7]

(Reference is made to the control apparatus according to the second aspect).

[Mode 8]

The control apparatus according to mode 7, wherein, the request suppressing unit sets, in the entry memory of the communication node, a second control information entry that causes dropping of the packet(s) having a characteristic in common with the packet for which the control information entry setting request was made to the preset control apparatus, so as to suppress the control information entry setting request(s) for a preset time.

[Mode 9]

The control apparatus according to mode 7 or 8, wherein, the request suppressing unit commences the control information entry setting suppressing operation after a number of the packets for which the control information entry setting requests were made from the communication node has reached a preset value.

[Mode 10]

The control apparatus according to any one of modes 7 to 9, wherein, a wildcard is used in a match condition in the second control information entry that causes dropping of the packet(s) having a characteristic in common with the packet for which the control information entry setting request was made, whereby the packet(s) other than the packet for which the control information entry setting request was made is also dropped for a preset time.

[Mode 11]

(Reference is made to the above mentioned communication system according to the third aspect).

[Mode 12]

(Reference is made to the above mentioned packet processing method according to the fourth aspect).

[Mode 13]

(Reference is made to the above mentioned communication node controlling method according to the fifth aspect).

[Mode 14]

(Reference is made to the above mentioned program according to the sixth aspect).

It is noted that, like the mode 1, the modes 11 to 14 may be extended to the modes 2 to 6.

The disclosures of the above mentioned Patent Documents as well as non-Patent Documents are to be incorporated herein by reference. The exemplary embodiments or Examples may be modified or adjusted within the concept of the total disclosures of the present invention, inclusive of claims, based on the fundamental technical concept of the invention. A wide variety of combinations or selections of elements herein disclosed (elements of claims, Examples and drawings) may be made within the context of the claims of the present invention. That is, the present invention may include a wide variety of changes or corrections that may occur to those skilled in the art in accordance with the total disclosures inclusive of the claims and the drawings as well as the technical concept of the invention. In particular, it should be understood that any optional numerical figures or sub-ranges contained in the ranges of numerical values set out herein ought to be construed to be specifically stated even in the absence of explicit statements.

What is claimed is:

1. A communication node, comprising:
   an entry memory capable of retaining a control information entry stipulating a processing to be applied to a packet received;
   a packet processor referencing the entry memory to process the packet received; and
   a request suppressing unit that, triggered by reception of a first packet, being configured to request a preset control apparatus to set the control information entry and configured to subsequently suppress a control information entry setting request(s) for a preset time for a second packet having a characteristic in common with the first packet for which the control information entry setting request was made to the preset control apparatus, wherein the request suppressing unit being configured to commence an operation of control information entry setting suppression after a number of the first packets for which the control information entry setting requests were made to the preset control apparatus has reached a preset vale.

2. The communication node according to claim 1, wherein, the request suppressing unit is configured to set in the entry memory a second control information entry that causes dropping of the second packet(s) having a characteristic in common with the first packet for which the control information entry setting request was made to the preset control apparatus, so as to suppress the control information entry setting request(s) for a preset time.

3. The communication node according to claim 1, further comprising:

a suppressing cache that retains information regarding the first packet for which the control information entry setting request was made to the preset control apparatus;

the request suppressing unit being configured to reference the suppressing cache to suppress the control information entry setting request(s) to the preset control apparatus.

4. The communication node according to claim 3, wherein, suppression of the control information entry setting request(s) by the suppressing cache is carried out in preference to suppression of control information entry setting request(s) by the setting in the entry memory of the entry that causes dropping of the second packet(s) having a characteristic in common with the first packet for which the control information entry setting request was made to the preset control apparatus.

5. The communication node according to claim 1, wherein, a wildcard is used in a match condition for the second control information entry that causes dropping of the second packet(s) having a characteristic in common with the first packet for which the control information entry setting request was made to the preset control apparatus, whereby a third packet(s) other than the first packet that triggered the control information entry setting request is also dropped for a preset time.

6. A control apparatus that controls a communication node including an entry memory capable of retaining a control information entry stipulating a processing to be applied to a packet received and a packet processor referencing the entry memory to process the packet received; wherein, the control apparatus includes a request suppressing unit configured to suppress a control information entry setting request(s) from a controller of the communication node for a preset time as concerns a second packet(s) having a characteristic in common with a first packet for which the control information entry setting request was made from the communication node, wherein the request suppressing unit is configured to commence an operation of control information entry setting suppression after a number of the first packets for which the control information entry setting requests were made to the preset control apparatus has reached a preset value.

7. The control apparatus according to claim 6, wherein, the request suppressing unit is configured to set, in the entry memory of the communication node, a second control information entry that causes dropping of the second packet(s) having a characteristic in common with the first packet for which the control information entry setting request was made to the preset control apparatus, so as to suppress the control information entry setting request(s) for a preset time.

8. The control apparatus according to claim 6, wherein, the request suppressing unit is configured to commence the control information entry setting suppressing operation after a number of the first packets for which the control information entry setting requests were made from the communication node has reached a preset value.

9. The control apparatus according to claim 6, wherein, a wildcard is used in a match condition in the second control information entry that causes dropping of the second packet(s) having a characteristic in common with the first packet for which the control information entry setting request was made, whereby a third packet(s) other than the first packet for which the control information entry setting request was made also is dropped for a preset time.

10. A communication system, comprising:

a control apparatus that causes a control information entry to be set in a pertinent communication node in response to a control information entry setting request from a communication node, and the communication node(s);

the communication node including:

an entry memory capable of retaining the control information entry that stipulates a processing to be applied to a packet received;

a packet processor that references the entry memory to process the packet received; and a request suppressing unit that, triggered by reception of a fit packet, requests a preset control apparatus to set the control information entry and subsequently suppresses a control information entry setting request(s) for a preset time for a second packet(s) having a characteristic in common with the first packet for which the control information entry setting request was made to the preset control apparatus, wherein the request suppressing unit is configured to commence an operation of control information entry setting suppression after a number of the first packets for which the control information entry setting requests were made to the preset control apparatus has reached a preset value.

11. A method for processing a packet comprising:

requesting, in response to reception of a first packet, for which a control information entry setting request is to be made to a preset control apparatus, the preset control apparatus to set the control information entry;

dropping a second packet received within a preset time as from reception of the first packet in case the second packet has a characteristic in common with the first packet, and commencing an operation of control information entry setting suppression after a number of the first packets for which the control information entry setting requests were made to the preset control apparatus has reached a reset value.

12. A method for controlling a communication node(s) comprising:
- setting, by a control apparatus configured to control the communication node(s), a control information entry in a pertinent communication node in response to a control information entry setting request from the communication node;
- controlling, by the control apparatus, the communication node so as to suppress the control information entry setting request(s) for a preset time as concerns a second packet(s) having a characteristic in common with a first packet for which the control information entry setting request was made; and
- commencing an operation of control information entry setting suppression after a number of the first packets for which the control information entry setting requests were made to the preset control apparatus has reached a preset value.

13. A non-transitory computer-readable recording medium storing a program for causing a computer loaded on a communication node to perform:
- the processing of requesting, in response to reception of a first packet, for which a control information entry setting request is to be made to a preset control apparatus, the preset control apparatus to set a control information entry;
- the processing of dropping a second packet received within a preset time as from reception of the first packet, in case the second packet has a characteristic in common with the first packet; and
- the processing of commencing an operation of control information entry setting suppression after a number of the first packets for which the control information entry setting requests were made to the preset control apparatus has reached a preset value.

14. A non-transitory computer-readable recording medium storing a program for causing a computer loaded on a control apparatus to perform:
- the processing of setting, in response to a control information entry setting request from a communication node(s), a control information entry in a pertinent communication node;
- the processing of controlling the communication node so as to suppress the control information entry setting request(s) for a preset time for a second packet(s) having a characteristic in common with a first packet for which the control information entry setting request was made; and
- the processing of commencing an oration of control information en setting suppression after a number of the first packets for which the control information entry setting requests were made has reached a preset value.

* * * * *